(12) United States Patent
Huang et al.

(10) Patent No.: US 11,163,388 B1
(45) Date of Patent: Nov. 2, 2021

(54) TOUCH CONTROL ARRAY SUBSTRATE AND DISPLAY DEVICE

(71) Applicant: WUHAN CHINA STAR OPTOELECTRONICS TECHNOLOGY CO., LTD., Hubei (CN)

(72) Inventors: Yaoli Huang, Hubei (CN); Xinglong He, Hubei (CN)

(73) Assignee: WUHAN CHINA STAR OPTOELECTRONICS TECHNOLOGY CO., LTD., Wuhan (CN)

(*) Notice: Subject to any disclaimer, the term of this patent is extended or adjusted under 35 U.S.C. 154(b) by 322 days.

(21) Appl. No.: 16/489,400

(22) PCT Filed: Nov. 7, 2018

(86) PCT No.: PCT/CN2018/114249
§ 371 (c)(1),
(2) Date: Aug. 28, 2019

(87) PCT Pub. No.: WO2020/042358
PCT Pub. Date: Mar. 5, 2020

(30) Foreign Application Priority Data

Aug. 31, 2018 (CN) .......................... 201811014494.3

(51) Int. Cl.
*G06F 3/041* (2006.01)
*G06F 3/044* (2006.01)
*G02F 1/1333* (2006.01)

(52) U.S. Cl.
CPC .......... *G06F 3/0412* (2013.01); *G06F 3/0443* (2019.05); *G06F 3/04164* (2019.05); *G02F 1/13338* (2013.01)

(58) Field of Classification Search
None
See application file for complete search history.

(56) References Cited

U.S. PATENT DOCUMENTS

2016/0103547 A1* 4/2016 Lu ........................ G06F 3/0488
345/174

* cited by examiner

*Primary Examiner* — Duane N Taylor, Jr.

(57) ABSTRACT

A touch-control array substrate and a display device are provided. A plurality of touch-control units are arranged on the touch-control array substrate. A product of a resistance value of a touch-control circuit of the touch-control units and a capacitive value of the touch-control electrode of the touch-control units is constant. The effort for the touch-control chip to drive the far-IC terminal touch-control electrode is the same as the effort to drive the near-IC terminal touch-control electrode. So it will not occur that to drive the far-IC terminal touch-control electrode is difficult or unsuccessful.

20 Claims, 3 Drawing Sheets

TOUCH CONTROL ARRAY SUBSTRATE AND DISPLAY DEVICE

BACKGROUND

1. Field of the Disclosure

The present disclosure relates to a field of touch-control display, and more particularly, to a touch-control array substrate and a display device.

2. Description of the Related Art

To improve the user experience, a display device has been widely integrated into a touch screen (in-cell panel, a touch-control array substrate). The touch screen is configured to sense a touch position where touch-control electrodes are integrated into a display device so that a display touch-control panel can thinner overall.

Figure 1:
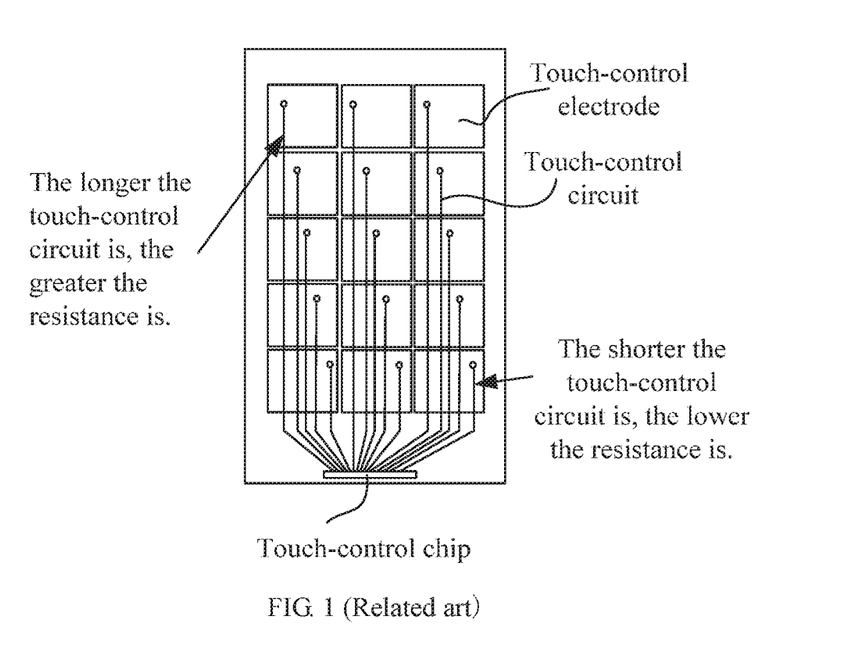
FIG. 1 illustrates a schematic diagram of a conventional touch-control array substrate.

As FIG. 1 illustrates, a touch-control layer in an in-cell panel touch-control layer is a commonly displayed VCOM layer. The entire VCOM layer is divided into a plurality of touch-control electrodes of similar size (generally rectangular). The touch-control electrode is connected to a TDDI chip (i.e., the touch-control chip, IC) through a touch-control circuit. The touch-control circuit is short when the touch-control electrode is close to the TDDI chip, and the resistor R of the touch-control circuit is small. The touch-control circuit is long when the touch-control electrode is away from the TDDI chip, and the resistor R of the touch-control circuit is great. The size and shape of each of the touch-control electrodes is similar, so the capacitive value of each of the touch-control electrodes C is similar.

That is, the resistance (R value) of the touch-control circuit for a near-TDDI chip is small while the R value of the touch-control line for a far-TDDI chip is large. The capacitance (C value) of the touch-control electrode is the same. The RC loading of the touch-control electrode shows inconsistent for different distances. (The greater R*C is, the greater the RC loading becomes.)

The greater the RC loading is, the more difficult to drive an integrated circuit (IC) driver becomes. The in-cell panel is in a small size so the IC can reluctantly be driven though the RC loading away from the IC. The touch-control electrode away from the IC terminal in the large-size in-cell panel needs a longer touch-control circuit, a greater R value, the greater area of the touch-control electrode of the panel, and a greater C value, which causes the RC loading over the IC drive range, thereby causing to drive the touch-control electrode away from the IC terminal more difficult or even impossible to drive the touch-control electrode away from the IC terminal.

The touch-control array substrate of the related art encounters the technical problem that the touch-control electrode away from the IC terminal is hard to be driven or even is impossible to drive the touch-control electrode away from the IC terminal.

SUMMARY

The present disclosure proposes a touch-control array substrate and a display device to solve the technical problem of the related art that the touch-control electrode away from an integrated circuit (IC) terminal is hard to be driven or even is impossible to drive the touch-control electrode away from the IC terminal.

According to a first aspect of the present disclosure, a touch-control array substrate comprises a base substrate, a thin film transistor (TFT) structure layer arranged on the base substrate and comprising a gate line and a source line being stacked, a planar layer arranged on the TFT structure layer, a touch-control electrode layer arranged on the planar layer and comprising a touch-control electrode, an insulating layer arranged on the touch-control electrode layer, a touch-control circuit layer arranged on the insulating layer and comprising a touch-control circuit that penetrates the insulating layer to electrically connecting the touch-control electrode, a passivation layer arranged on the touch-control circuit layer, and a pixel electrode layer, arranged on the passivation layer and comprising a pixel electrode. The touch-control array substrate comprises a touch-control functional area and a touch-control chip; the touch-control chip is disposed outside the touch-control functional area. A plurality of touch-control units are arranged in the touch-control functional area. The touch-control unit comprises the touch-control electrode, the touch-control circuit corresponding to the touch-control electrode, the gate line, the source line, and the pixel electrode arranged in an area corresponding to the touch-control electrode. The touch-control unit is electrically connected to the touch-control chip through the touch-control circuit. A product of a resistance value of the touch-control circuit of the plurality of touch-control units and a capacitive value of the touch-control electrode of the plurality of touch-control units is constant. The capacitive value of the touch-control electrode comprises a capacitive value between the touch-control electrode and the pixel electrode, a capacitive value between the touch-control electrode and the gate line, a capacitive value between the touch-control electrode and the source line, and a self-capacitive value of touch-control electrode.

According to one embodiment of the present disclosure, a total area of the pixel electrode in the touch-control unit is gradually reduced in a direction away from the touch-control chip.

According to one embodiment of the present disclosure, the total area of each of the pixel electrodes in the touch-control unit is gradually reduced in a direction away from the touch-control chip.

According to one embodiment of the present disclosure, grayscale brightness of the touch-control unit is gradually increased in a direction away from a touch-control chip.

According to one embodiment of the present disclosure, the total area of the source line in the touch-control unit is gradually reduced in a direction away from the touch-control chip.

According to one embodiment of the present disclosure, the width of the source line in a touch-control unit is gradually reduced in a direction away from a touch-control chip.

According to one embodiment of the present disclosure, the touch-control functional area comprises two or more touch-control secondary areas in a direction away from a touch-control chip; in the same touch-control secondary area, the capacitive value of the touch-control electrode of the touch-control unit is the same; in different touch-control secondary areas, the capacitive value of the touch-control electrode of the touch-control unit is different.

According to one embodiment of the present disclosure, a touch-control functional area comprises a first touch-control secondary area, a second touch-control secondary area, and a third touch-control secondary area; the total area of the pixel electrode S1 of the touch-control unit in the first touch-control secondary area, the total area of the pixel electrode S2 of the touch-control unit in the second touch-control secondary area, and the total area of the pixel electrode S3 of the touch-control unit in the third touch-control secondary area satisfy the requirement: S1:S2:S3=1: 0.8:0.6.

According to one embodiment of the present disclosure, a gate driving voltage V1 of the pixel electrode in the first touch-control secondary area, a gate driving voltage V2 of the pixel electrode in the second touch-control secondary area, and a gate driving voltage V3 of the pixel electrode in the third touch-control secondary area satisfy the requirement: V1:V2:V3=9:10:11.

According to one embodiment of the present disclosure, the width W1 of the source line of the touch-control unit in the first touch-control secondary area, the width W2 of the source line of the touch-control unit in the second touch-control secondary area, and the width W3 of the source line of the touch-control unit in the third touch-control secondary area satisfy the requirement: W1:W2:W3=1:0.8:0.6.

According to a second aspect of the present disclosure, a display device comprises a touch-control chip and a touch-control array substrate. The touch-control array substrate comprises a base substrate, a thin film transistor (TFT) structure layer arranged on the base substrate and comprising a gate line and a source line being stacked, a planar layer arranged on the TFT structure layer, a touch-control electrode layer arranged on the planar layer and comprising a touch-control electrode, an insulating layer arranged on the touch-control electrode layer, a touch-control circuit layer arranged on the insulating layer and comprising a touch-control circuit that penetrates the insulating layer to electrically connecting the touch-control electrode, a passivation layer arranged on the touch-control circuit layer, and a pixel electrode layer, arranged on the passivation layer and comprising a pixel electrode. The touch-control array substrate comprises a touch-control functional area and a touch-control chip; the touch-control chip is disposed outside the touch-control functional area. A plurality of touch-control units are arranged in the touch-control functional area. The touch-control unit comprises the touch-control electrode, the touch-control circuit corresponding to the touch-control electrode, the gate line, the source line, and the pixel electrode arranged in an area corresponding to the touch-control electrode. The touch-control unit is electrically connected to the touch-control chip through the touch-control circuit. A product of a resistance value of the touch-control circuit of the plurality of touch-control units and a capacitive value of the touch-control electrode of the plurality of touch-control units is constant. The capacitive value of the touch-control electrode comprises a capacitive value between the touch-control electrode and the pixel electrode, a capacitive value between the touch-control electrode and the gate line, a capacitive value between the touch-control electrode and the source line, and a self-capacitive value of touch-control electrode.

According to one embodiment of the present disclosure, a total area of the pixel electrode in the touch-control unit is gradually reduced in a direction away from the touch-control chip.

According to one embodiment of the present disclosure, the total area of each of the pixel electrodes in the touch-control unit is gradually reduced in a direction away from the touch-control chip.

According to one embodiment of the present disclosure, grayscale brightness of the touch-control unit is gradually increased in a direction away from a touch-control chip.

According to one embodiment of the present disclosure, the total area of the source line in the touch-control unit is gradually reduced in a direction away from the touch-control chip.

According to one embodiment of the present disclosure, the width of the source line in a touch-control unit is gradually reduced in a direction away from a touch-control chip.

According to one embodiment of the present disclosure, the touch-control functional area comprises two or more touch-control secondary areas in a direction away from a touch-control chip; in the same touch-control secondary area, the capacitive value of the touch-control electrode of the touch-control unit is the same; in different touch-control secondary areas, the capacitive value of the touch-control electrode of the touch-control unit is different.

According to one embodiment of the present disclosure, a touch-control functional area comprises a first touch-control secondary area, a second touch-control secondary area, and a third touch-control secondary area; the total area of the pixel electrode S1 of the touch-control unit in the first touch-control secondary area, the total area of the pixel electrode S2 of the touch-control unit in the second touch-control secondary area, and the total area of the pixel electrode S3 of the touch-control unit in the third touch-control secondary area satisfy the requirement: S1:S2:S3=1: 0.8:0.6.

According to one embodiment of the present disclosure, a gate driving voltage V1 of the pixel electrode in the first touch-control secondary area, a gate driving voltage V2 of the pixel electrode in the second touch-control secondary area, and a gate driving voltage V3 of the pixel electrode in the third touch-control secondary area satisfy the requirement: V1:V2:V3=9:10:11.

According to one embodiment of the present disclosure, the width W1 of the source line of the touch-control unit in the first touch-control secondary area, the width W2 of the source line of the touch-control unit in the second touch-control secondary area, and the width W3 of the source line of the touch-control unit in the third touch-control secondary area satisfy the requirement: W1:W2:W3=1:0.8:0.6.

The benefit of the present disclosure is described as follows. The present disclosure proposes a new touch-control array substrate and a display device. A plurality of touch-control units are arranged in a touch-control area of the touch-control array substrate. The touch-control unit includes a touch-control electrode, a touch-control circuit corresponding to the touch-control electrode, a gate line, a source line, and a pixel electrode arranged in an area corresponding to the touch-control electrode. The touch-control unit is electrically connected to the touch-control chip through the touch-control circuit. The product of the resistance value of the touch-control circuit of the plurality of touch-control units and the capacitive value of the touch-control electrode of the plurality of touch-control units is constant. The RC loading of the touch-control electrode away from the IC terminal is the same as the RC loading of the touch-control electrode near the IC terminal basically no matter how far or how close. The effort for the touch-control chip to drive the far-IC terminal touch-control electrode is the same as the effort to drive the near-IC terminal touch-control electrode. So it will not occur that to drive the far-IC terminal touch-control electrode is difficult or unsuccessful. So, the problem that to drive far-IC terminal touch-control electrode is difficult or unsuccessful is resolved.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF THE EMBODIMENTS

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures.

Figure 4:
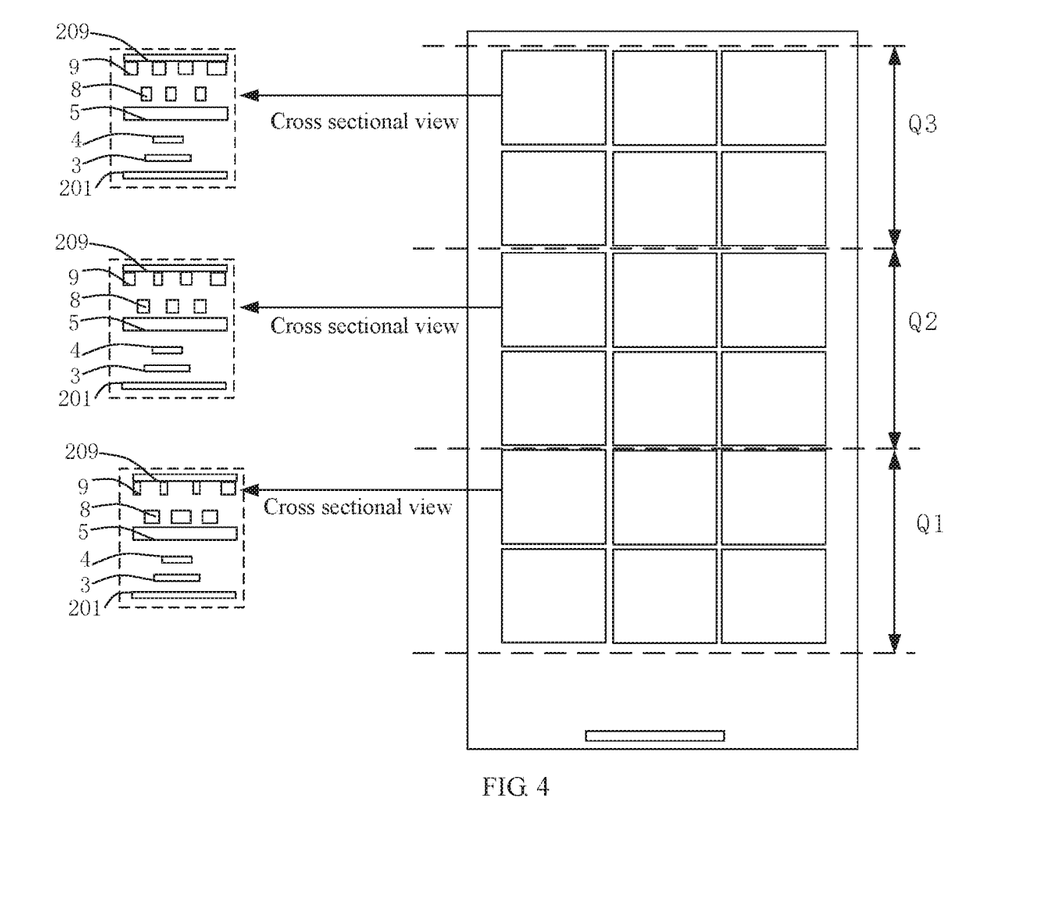
FIG. 4 illustrates a first layout of the touch-control array substrate according to an embodiment of the present disclosure.
Figure 5:
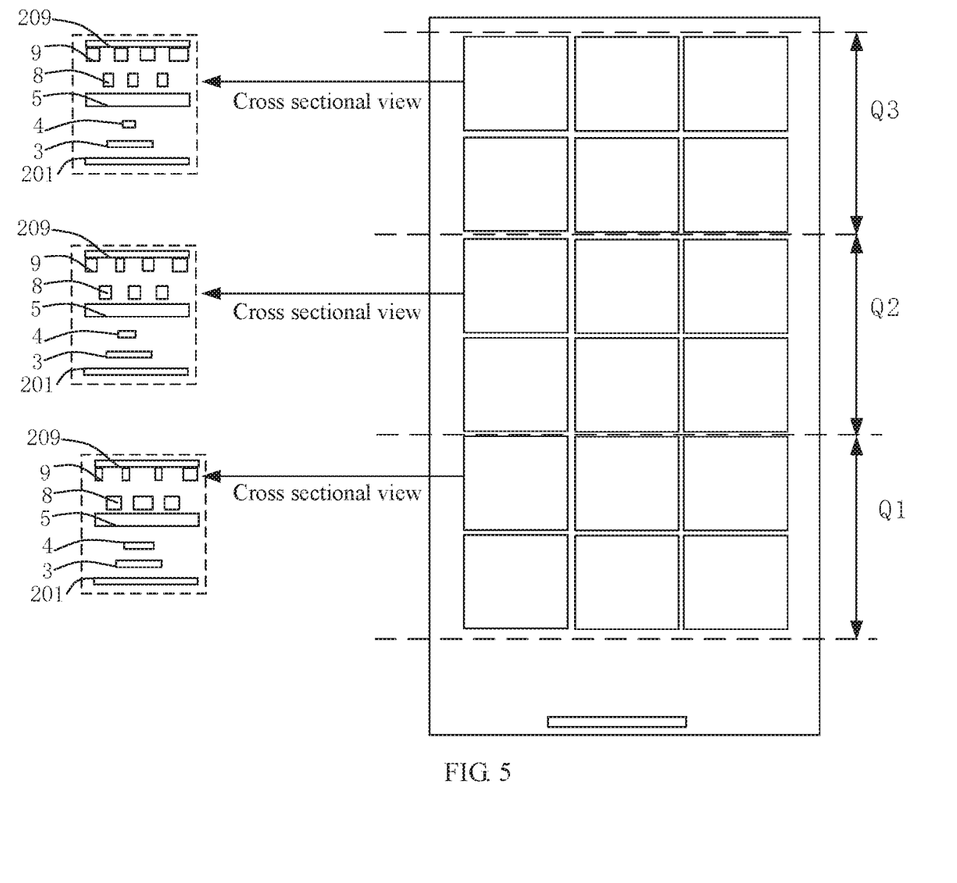
FIG. 5 illustrates a second layout of the touch-control array substrate according to an embodiment of the present disclosure.

For a touch-control array substrate of the related art as illustrated in FIG. 1, a touch-control electrode away from an integrated circuit (IC) terminal is driven difficultly or fails to be driven. As illustrated in FIG. 4 or FIG. 5, the area of a pixel electrode away from the IC terminal or the width of a source line is gradually reduced to decrease the capacitance of the touch-control electrode in a direction away from a touch-control chip to deal with the defaults of the related art.

The liquid crystal panel or touch-control panel proposed by the present disclosure includes an array substrate and a color filter substrate. The array substrate and the color filter substrate are attached, and liquid crystal is added between the array substrate and the color filter substrate to obtain a liquid crystal panel. A parallel plate capacitor formed by the common electrode on the pixel electrode on the array substrate and the color filter substrate is a liquid crystal capacitor. A parallel plate capacitor formed by the common electrode on the pixel electrode on the array substrate and the array substrate is a storage capacitor.

Figure 2:
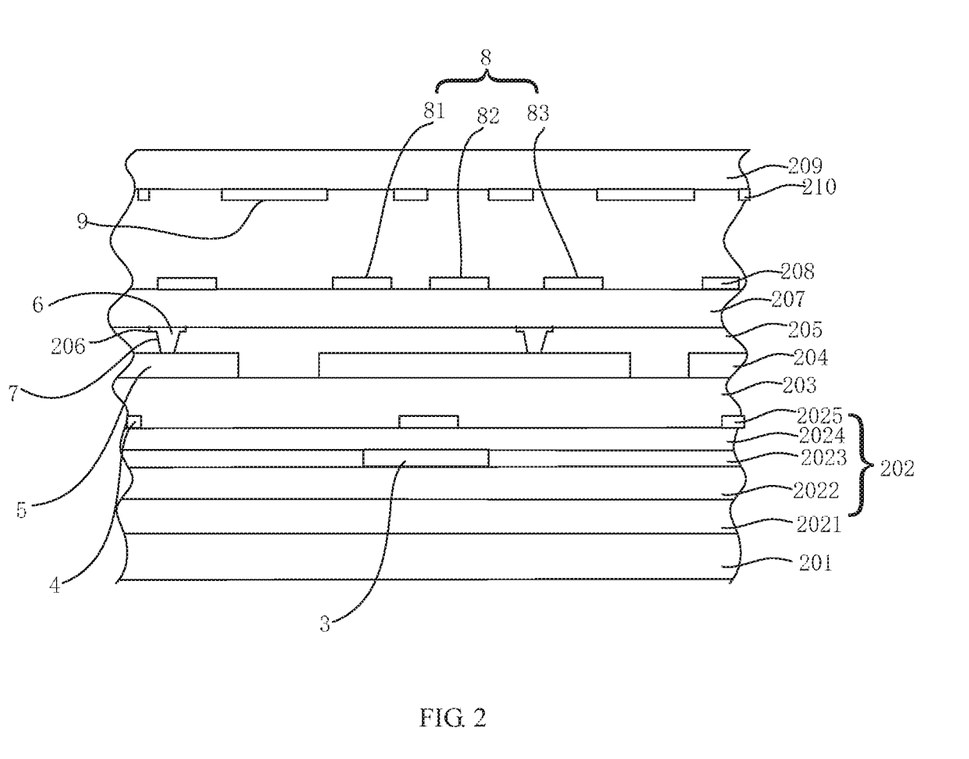
FIG. 2 illustrates a structure of a touch-control array substrate according to an embodiment of the present disclosure.

As FIG. 2 illustrates, the touch-control array substrate includes a base substrate 201, a thin film transistor (TFT) structure layer 202, a planar layer 203, a touch-control electrode layer 204, an insulating layer 205, a touch-control circuit layer 206, a passivation layer 207, and a pixel electrode layer 208. The TFT structure layer 202 is arranged on the base substrate 201. The TFT structure layer 202 is arranged on the base substrate 201. The planar layer 203 is arranged on the TFT structure layer 202. The touch-control electrode layer 204 is arranged on the planar layer 203. The insulating layer 205 is arranged on the touch-control electrode layer 204. The touch-control circuit layer 206 is arranged on the insulating layer 205. The passivation layer 207 is arranged on the touch-control circuit layer 206. The pixel electrode layer 208 is arranged on the passivation layer 207.

The TFT structure layer 202 includes a first insulating layer 2021, a second insulating layer 2022, a gate line layer 2023 (i.e., the first metal layer), a third insulating layer 2024, and a source line layer 2025 (i.e., the second metal layer). The first insulating layer 2021, the second insulating layer 2022, the gate line layer 2023, the third insulating layer 2024, and the source line layer 2025 are stacked. The gate line layer 2023 is patterned to form the gate line 3. The source line layer 2025 is patterned to form the source line 4. The gate line 3 and the source line 4 are stacked.

The touch-control electrode layer 204 is patterned to form a touch-control electrode 5. The touch-control circuit layer 206 is patterned to form a touch-control circuit 6 and then penetrates the insulating layer 205 through the hole 7 to be electrically connected the corresponding touch-control electrode 5. The pixel electrode layer 208 is patterned to form a pixel electrode 8.

The color filter substrate includes a base substrate 209. The light-shielding layer 209 is arranged on a base substrate 210. The light-shielding layer 210 is patterned to form a black matrix 9.

Figure 3:
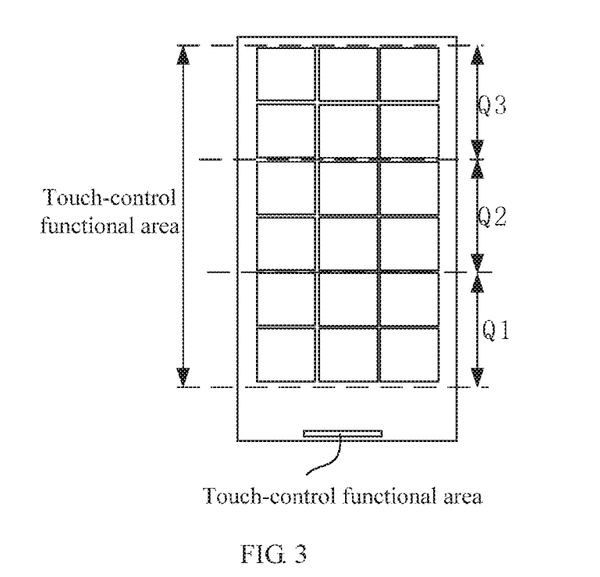
FIG. 3 illustrates a touch-control functional area of the touch-control array substrate and a touch-control chip.

As FIG. 3 illustrates, the touch-control array substrate includes a touch-control functional area TP and a touch-control chip. The touch-control chip is disposed outside the touch-control functional area TP. A plurality of touch-control units W are arranged in the touch-control functional area TP.

The touch-control unit W includes a touch-control electrode 5, a touch-control circuit 6, a gate line 3, a source line 4, and a pixel electrode 8. The touch-control circuit 6 corresponds to the touch-control electrode 5. The gate line 3, the source line 4, and the pixel electrode 8 are arranged in an area which corresponds to the touch-control electrode 5. The touch-control unit W is electrically connected to the touch-control chip through the touch-control circuit 6. The product RC loading of the resistance value R of the touch-control circuit of the plurality of touch-control unit and the capacitive value C of the touch-control electrode is constant. The capacitive value C of the touch-control electrode includes a capacitive value C1 between the touch-control electrode and the pixel electrode, a capacitive value between the touch-control electrode and the gate line, a capacitive value C3 between the touch-control electrode and the source line, and a self-capacitive value of touch-control electrode.

The RC loading of the touch-control electrode away from the IC terminal is arranged to be the same as the RC loading of the touch-control electrode near the IC terminal. The RC loading is constantly identical no matter how far and how near. The effort for the touch-control chip to drive the far-IC terminal touch-control electrode is the same as the effort to drive the near-IC terminal touch-control electrode. So it will not occur that to drive the far-IC terminal touch-control electrode is difficult or unsuccessful. So, the problem that to drive far-IC terminal touch-control electrode is difficult or unsuccessful is resolved.

In another embodiment, the total area of a pixel electrode in a touch-control unit is gradually reduced in a direction away from a touch-control chip. The area between the pixel electrode and the touch-control electrode decreases, resulting in a decrease in the corresponding capacitor C1.

AS FIG. 2 illustrates, the pixel electrode 8 includes a plurality of secondary pixel electrodes, such as a red (R) secondary pixel electrode 81, a green (G) secondary pixel electrode 82, and a blue (B) secondary pixel electrode 83. In another embodiment, to ensure the uniformity of the spectrum, the area of each secondary pixel electrode in a touch-control unit is gradually reduced in a direction away from a touch-control chip. For example, the red (R) secondary pixel electrode 81, the green (G) secondary pixel electrode 82, the blue (B) secondary pixel electrode 83 in the touch-control unit are reduced in equal proportions in a direction away from a touch-control chip.

In order to avoid different pixel units with diverse brightness of an emitted light due to the pixel electrodes with different sizes, the grayscale brightness of a great pixel electrode and the grayscale brightness of a middle pixel electrode are reduced by reducing the corresponding gate driving voltage for the request of appropriately reducing the same target brightness. As a result, the final grayscale brightness of the great pixel electrode, the final grayscale brightness of the middle pixel electrode, and the final grayscale brightness of the small pixel electrode are all consistent. In another embodiment, the grayscale brightness of the touch-control unit is gradually increased in a direction away from a touch-control chip.

In another embodiment, the total area of a source line in a touch-control unit is gradually reduced in a direction away from a touch-control chip.

In another embodiment, the width of a source line in a touch-control unit is gradually reduced in a direction away from a touch-control chip to reduce the complexity of the template pattern for patternization.

In another embodiment, the total area of a gate line in a touch-control unit is gradually reduced in a direction away from a touch-control chip.

In another embodiment, the width of a gate line in a touch-control unit is gradually reduced in a direction away from a touch-control chip to reduce the complexity of the template pattern for patternization.

In another embodiment, as FIG. 3 illustrates, a touch-control functional area includes two or more touch-control secondary areas in a direction away from a touch-control chip. In the same touch-control secondary area, the capacitive value of the touch-control electrode of the touch-control unit is the same. In different touch-control secondary areas, the capacitive value of the touch-control electrode of the touch-control unit is not the same.

In another embodiment, as FIG. 3 illustrates, a touch-control functional area includes a first touch-control secondary area Q1 (one-third of the area near an integrated circuit (IC) terminal), a second touch-control secondary area Q2 (one-third of the middle area), and a third touch-control secondary area Q3 (one-third of the area away from the IC terminal).

As FIG. 4 illustrates, the total area of the pixel electrode S1 of the touch-control unit in the first touch-control secondary area, the total area of the pixel electrode S2 of the touch-control unit in the second touch-control secondary area, and the total area of the pixel electrode S3 of the touch-control unit in the third touch-control secondary area satisfy the requirement: S1:S2:S3=1:0.8:0.6. At the same time, the shading area of a black matrix BM9 is widening to avoid light leakage.

In another embodiment, a gate driving voltage V1 of the pixel electrode in the first touch-control secondary area, a gate driving voltage V2 of the pixel electrode in the second touch-control secondary area, and a gate driving voltage V3 of the pixel electrode in the third touch-control secondary area satisfy the requirement: V1:V2:V3=9:10:11. Take 255 grayscale for example. V1 is 4.5V; V2 is 5V; V3 is 5.5V.

As FIG. 5 illustrates, while the capacitive value C1 is changed, the capacitive value C3 of the touch-control electrode and the capacitive value C3 of the source line is changed. Further, the RC loading of the far terminal touch-control electrode is reduced. If the source line is rough, the area overlapped by the source line and the touch-control electrode is great. The capacitive value of the source line and the capacitive value of the touch-control electrode are great as well. In other words, the capacitive value of the source line and the capacitive value of the touch-control electrode are reduced once the width of the source line is reduced. The width W1 of the source line of the touch-control unit in the first touch-control secondary area, the width W2 of the source line of the touch-control unit in the second touch-control secondary area, and the width W3 of the source line of the touch-control unit in the third touch-control secondary area satisfy the requirement: W1:W2:W3=1:0.8:0.6.

In another embodiment, as FIG. 3 illustrates, a display device proposed by the present disclosure includes a touch-control chip and a touch-control array substrate. The touch-control array substrate includes a base substrate 201, a thin film transistor (TFT) structure layer 202, a planar layer 203, a touch-control electrode layer 204, an insulating layer 205, a touch-control circuit layer 206, a passivation layer 207, and a pixel electrode layer 208. The TFT structure layer 202 is arranged on the base substrate 201. The TFT structure layer 202 is arranged on the base substrate 201. The planar layer 203 is arranged on the TFT structure layer 202. The touch-control electrode layer 204 is arranged on the planar layer 203. The insulating layer 205 is arranged on the touch-control electrode layer 204. The touch-control circuit layer 206 is arranged on the insulating layer 205. The passivation layer 207 is arranged on the touch-control circuit layer 206. The pixel electrode layer 208 is arranged on the passivation layer 207.

The TFT structure layer 202 includes a first insulating layer 2021, a second insulating layer 2022, a gate line layer 2023 (i.e., the first metal layer), a third insulating layer 2024, and a source line layer 2025 (i.e., the second metal layer). The first insulating layer 2021, the second insulating layer 2022, the gate line layer 2023, the third insulating layer 2024, and the source line layer 2025 are stacked. The gate line layer 2023 is patterned to form the gate line 3. The source line layer 2025 is patterned to form the source line 4. The gate line 3 and the source line 4 are stacked.

The touch-control electrode layer 204 is patterned to form a touch-control electrode 5. The touch-control circuit layer 206 is patterned to form a touch-control circuit 6 and then penetrates the insulating layer 205 through the hole 7 to be electrically connected the corresponding touch-control electrode 5. The pixel electrode layer 208 is patterned to form a pixel electrode 8.

The color filter substrate includes a base substrate 209. The light-shielding layer 209 is arranged on a base substrate 210. The light-shielding layer 210 is patterned to form a black matrix 9.

As FIG. 3 illustrates, the touch-control array substrate includes a touch-control functional area TP and a touch-control chip. The touch-control chip is disposed outside the touch-control functional area TP. A plurality of touch-control units W are arranged in the touch-control functional area TP.

The touch-control unit W includes a touch-control electrode 5, a touch-control circuit 6, a gate line 3, a source line 4, and a pixel electrode 8. The touch-control circuit 6 corresponds to the touch-control electrode 5. The gate line 3, the source line 4, and the pixel electrode 8 are arranged in an area which corresponds to the touch-control electrode 5. The touch-control unit W is electrically connected to the touch-control chip through the touch-control circuit 6. The product RC loading of the resistance value R of the touch-control circuit of the plurality of touch-control unit and the capacitive value C of the touch-control electrode is constant. The capacitive value C of the touch-control electrode includes a capacitive value C1 between the touch-control electrode and the pixel electrode, a capacitive value between the touch-control electrode and the gate line, a capacitive value C3 between the touch-control electrode and the source line, and a self-capacitive value of touch-control electrode.

The RC loading of the touch-control electrode away from the IC terminal is arranged to be the same as the RC loading of the touch-control electrode near the IC terminal. The RC loading is constantly identical no matter how far and how near. The effort for the touch-control chip to drive the far-IC terminal touch-control electrode is the same as the effort to drive the near-IC terminal touch-control electrode. So it will not occur that to drive the far-IC terminal touch-control electrode is difficult or unsuccessful. So, the problem that to drive far-IC terminal touch-control electrode is difficult or unsuccessful is resolved.

In another embodiment, the total area of a pixel electrode in a touch-control unit is gradually reduced in a direction away from a touch-control chip. The area between the pixel electrode and the touch-control electrode decreases, resulting in a decrease in the corresponding capacitor C1.

AS FIG. 2 illustrates, the pixel electrode 8 includes a plurality of secondary pixel electrodes, such as a red (R) secondary pixel electrode 81, a green (G) secondary pixel electrode 82, and a blue (B) secondary pixel electrode 83. In another embodiment, to ensure the uniformity of the spectrum, the area of each secondary pixel electrode in a touch-control unit is gradually reduced in a direction away from a touch-control chip. For example, the red (R) secondary pixel electrode 81, the green (G) secondary pixel electrode 82, the blue (B) secondary pixel electrode 83 in the touch-control unit are reduced in equal proportions in a direction away from a touch-control chip.

In order to avoid different pixel units with diverse brightness of an emitted light due to the pixel electrodes with different sizes, the grayscale brightness of a great pixel electrode and the grayscale brightness of a middle pixel electrode are reduced by reducing the corresponding gate driving voltage for the request of appropriately reducing the same target brightness. As a result, the final grayscale brightness of the great pixel electrode, the final grayscale brightness of the middle pixel electrode, and the final grayscale brightness of the small pixel electrode are all consistent. In another embodiment, the grayscale brightness of the touch-control unit is gradually increased in a direction away from a touch-control chip.

In another embodiment, the total area of a source line in a touch-control unit is gradually reduced in a direction away from a touch-control chip.

In another embodiment, the width of a source line in a touch-control unit is gradually reduced in a direction away from a touch-control chip to reduce the complexity of the template pattern for patternization.

In another embodiment, the total area of a gate line in a touch-control unit is gradually reduced in a direction away from a touch-control chip.

In another embodiment, the width of a gate line in a touch-control unit is gradually reduced in a direction away from a touch-control chip to reduce the complexity of the template pattern for patternization.

In another embodiment, as FIG. 3 illustrates, a touch-control functional area includes two or more touch-control secondary areas in a direction away from a touch-control chip. In the same touch-control secondary area, the capacitive value of the touch-control electrode of the touch-control unit is the same. In different touch-control secondary areas, the capacitive value of the touch-control electrode of the touch-control unit is not the same.

In another embodiment, as FIG. 3 illustrates, a touch-control functional area includes a first touch-control secondary area Q1 (one-third of the area near an integrated circuit (IC) terminal), a second touch-control secondary area Q2 (one-third of the middle area), and a third touch-control secondary area Q3 (one-third of the area away from the IC terminal).

As FIG. 4 illustrates, the total area of the pixel electrode S1 of the touch-control unit in the first touch-control secondary area, the total area of the pixel electrode S2 of the touch-control unit in the second touch-control secondary area, and the total area of the pixel electrode S3 of the touch-control unit in the third touch-control secondary area satisfy the requirement: S1:S2:S3=1:0.8:0.6. At the same time, the shading area of a black matrix BM9 is widening to avoid light leakage.

In another embodiment, a gate driving voltage V1 of the pixel electrode in the first touch-control secondary area, a gate driving voltage V2 of the pixel electrode in the second touch-control secondary area, and a gate driving voltage V3 of the pixel electrode in the third touch-control secondary area satisfy the requirement: V1:V2:V3=9:10:11. Take 255 grayscale for example. V1 is 4.5V; V2 is 5V; V3 is 5.5V.

As FIG. 5 illustrates, while the capacitive value C1 is changed, the capacitive value C3 of the touch-control electrode and the capacitive value C3 of the source line is changed. Further, the RC loading of the far terminal touch-control electrode is reduced. If the source line is rough, the area overlapped by the source line and the touch-control electrode is great. The capacitive value of the source line and the capacitive value of the touch-control electrode are great as well. In other words, the capacitive value of the source line and the capacitive value of the touch-control electrode are reduced once the width of the source line is reduced. The width W1 of the source line of the touch-control unit in the first touch-control secondary area, the width W2 of the source line of the touch-control unit in the second touch-control secondary area, and the width W3 of the source line of the touch-control unit in the third touch-control secondary area satisfy the requirement: W1:W2:W3=1:0.8:0.6.

The present disclosure proposes a new touch-control array substrate and a display device. A plurality of touch-control units are arranged in a touch-control area of the touch-control array substrate. The touch-control unit includes a touch-control electrode, a touch-control circuit corresponding to the touch-control electrode, a gate line, a source line, and a pixel electrode arranged in an area corresponding to the touch-control electrode. The touch-control unit is electrically connected to the touch-control chip through the touch-control circuit. The product of the resistance value of the touch-control circuit of the plurality of touch-control units and the capacitive value of the touch-control electrode of the plurality of touch-control units is constant. The RC loading of the touch-control electrode away from the IC terminal is the same as the RC loading of the touch-control electrode near the IC terminal basically no matter how far or how close. The effort for the touch-control chip to drive the far-IC terminal touch-control electrode is the same as the effort to drive the near-IC terminal touch-control electrode. So it will not occur that to drive the far-IC terminal touch-control electrode is difficult or unsuccessful. So, the problem that to drive far-IC terminal touch-control electrode is difficult or unsuccessful is resolved.

While the present invention has been described in connection with what is considered the most practical and preferred embodiments, it is understood that this invention is not limited to the disclosed embodiments but is intended to cover various arrangements made without departing from the scope of the broadest interpretation of the appended claims.

What is claimed is:

1. A touch-control array substrate, comprising:
a base substrate;
a thin film transistor (TFT) structure layer, arranged on the base substrate and comprising a gate line and a source line, the gate line and the source line being stacked;
a planar layer, arranged on the TFT structure layer;
a touch-control electrode layer, arranged on the planar layer and comprising a touch-control electrode;
an insulating layer, arranged on the touch-control electrode layer;
a touch-control circuit layer, arranged on the insulating layer and comprising a touch-control circuit that penetrates the insulating layer to electrically connecting the touch-control electrode;
a passivation layer, arranged on the touch-control circuit layer; and
a pixel electrode layer, arranged on the passivation layer and comprising a pixel electrode,
wherein the touch-control array substrate comprises a touch-control functional area and a touch-control chip; the touch-control chip is disposed outside the touch-control functional area; a plurality of touch-control units are arranged in the touch-control functional area; the touch-control unit comprises the touch-control electrode, the touch-control circuit corresponding to the touch-control electrode, the gate line, the source line, and the pixel electrode arranged in an area corresponding to the touch-control electrode; the touch-control unit is electrically connected to the touch-control chip through the touch-control circuit;
wherein a product of a resistance value of the touch-control circuit of the plurality of touch-control units and a capacitive value of the touch-control electrode of the plurality of touch-control units is constant; the capacitive value of the touch-control electrode comprises a capacitive value between the touch-control electrode and the pixel electrode, a capacitive value between the touch-control electrode and the gate line, a capacitive value between the touch-control electrode and the source line, and a self-capacitive value of touch-control electrode.

2. The touch-control array substrate of claim 1, wherein a total area of the pixel electrode in the touch-control unit is gradually reduced in a direction away from the touch-control chip.

3. The touch-control array substrate of claim 2, wherein the total area of each of the pixel electrodes in the touch-control unit is gradually reduced in a direction away from the touch-control chip.

4. The touch-control array substrate of claim 2, wherein grayscale brightness of the touch-control unit is gradually increased in a direction away from a touch-control chip.

5. The touch-control array substrate of claim 1, wherein the total area of the source line in the touch-control unit is gradually reduced in a direction away from the touch-control chip.

6. The touch-control array substrate of claim 5, wherein the width of the source line in a touch-control unit is gradually reduced in a direction away from a touch-control chip.

7. The touch-control array substrate of claim 1, wherein the touch-control functional area comprises two or more touch-control secondary areas in a direction away from a touch-control chip; in the same touch-control secondary area, the capacitive value of the touch-control electrode of the touch-control unit is the same; in different touch-control secondary areas, the capacitive value of the touch-control electrode of the touch-control unit is different.

8. The touch-control array substrate of claim 7, wherein a touch-control functional area comprises a first touch-control secondary area, a second touch-control secondary area, and a third touch-control secondary area; the total area of the pixel electrode S1 of the touch-control unit in the first touch-control secondary area, the total area of the pixel electrode S2 of the touch-control unit in the second touch-control secondary area, and the total area of the pixel electrode S3 of the touch-control unit in the third touch-control secondary area satisfy the requirement: S1:S2:S3=1:0.8:0.6.

9. The touch-control array substrate of claim 8, wherein a gate driving voltage V1 of the pixel electrode in the first touch-control secondary area, a gate driving voltage V2 of the pixel electrode in the second touch-control secondary area, and a gate driving voltage V3 of the pixel electrode in the third touch-control secondary area satisfy the requirement: V1:V2:V3=9:10:11.

10. The touch-control array substrate of claim 8, wherein the width W1 of the source line of the touch-control unit in the first touch-control secondary area, the width W2 of the source line of the touch-control unit in the second touch-control secondary area, and the width W3 of the source line of the touch-control unit in the third touch-control secondary area satisfy the requirement: W1:W2:W3=1:0.8:0.6.

11. A display device, comprising:
a touch-control chip; and
a touch-control array substrate, comprising:
a base substrate;
a thin film transistor (TFT) structure layer, arranged on the base substrate and comprising a gate line and a source line, the gate line and the source line being stacked;
a planar layer, arranged on the TFT structure layer;
a touch-control electrode layer, arranged on the planar layer and comprising a touch-control electrode;
an insulating layer, arranged on the touch-control electrode layer;
a touch-control circuit layer, arranged on the insulating layer and comprising a touch-control circuit that penetrates the insulating layer to electrically connecting the touch-control electrode;
a passivation layer, arranged on the touch-control circuit layer; and
a pixel electrode layer, arranged on the passivation layer and comprising a pixel electrode,
wherein the touch-control array substrate comprises a touch-control functional area and a touch-control chip; the touch-control chip is disposed outside the touch-control functional area; a plurality of touch-control units are arranged in the touch-control functional area; the touch-control unit comprises the touch-control electrode, the touch-control circuit corresponding to the touch-control electrode, the gate line, the source line, and the pixel electrode arranged in an area corresponding to the touch-control electrode; the touch-control unit is electrically connected to the touch-control chip through the touch-control circuit;

wherein a product of a resistance value of the touch-control circuit of the plurality of touch-control units and a capacitive value of the touch-control electrode of the plurality of touch-control units is constant; the capacitive value of the touch-control electrode comprises a capacitive value between the touch-control electrode and the pixel electrode, a capacitive value between the touch-control electrode and the gate line, a capacitive value between the touch-control electrode and the source line, and a self-capacitive value of touch-control electrode.

12. The display device of claim 11, wherein a total area of the pixel electrode in the touch-control unit is gradually reduced in a direction away from the touch-control chip.

13. The display device of claim 12, wherein the total area of each of the pixel electrodes in the touch-control unit is gradually reduced in a direction away from the touch-control chip.

14. The display device of claim 12, wherein grayscale brightness of the touch-control unit is gradually increased in a direction away from a touch-control chip.

15. The display device of claim 11, wherein the total area of the source line in the touch-control unit is gradually reduced in a direction away from the touch-control chip.

16. The display device of claim 15, wherein a width of the source line in a touch-control unit is gradually reduced in a direction away from a touch-control chip.

17. The display device of claim 11, wherein the touch-control functional area comprises two or more touch-control secondary areas in a direction away from a touch-control chip; in the same touch-control secondary area, the capacitive value of the touch-control electrode of the touch-control unit is the same; in different touch-control secondary areas, the capacitive value of the touch-control electrode of the touch-control unit is different.

18. The display device of claim 17, wherein a touch-control functional area comprises a first touch-control secondary area, a second touch-control secondary area, and a third touch-control secondary area; the total area of the pixel electrode S1 of the touch-control unit in the first touch-control secondary area, the total area of the pixel electrode S2 of the touch-control unit in the second touch-control secondary area, and the total area of the pixel electrode S3 of the touch-control unit in the third touch-control secondary area satisfy the requirement: S1:S2:S3=1:0.8:0.6.

19. The display device of claim 18, wherein a gate driving voltage V1 of the pixel electrode in the first touch-control secondary area, a gate driving voltage V2 of the pixel electrode in the second touch-control secondary area, and a gate driving voltage V3 of the pixel electrode in the third touch-control secondary area satisfy the requirement: V1:V2:V3=9:10:11.

20. The display device of claim 18, wherein the width W1 of the source line of the touch-control unit in the first touch-control secondary area, the width W2 of the source line of the touch-control unit in the second touch-control secondary area, and the width W3 of the source line of the touch-control unit in the third touch-control secondary area satisfy the requirement: W1:W2:W3=1:0.8:0.6.

* * * * *